United States Patent

Perrie et al.

Patent Number: 5,939,704
Date of Patent: Aug. 17, 1999

[54] RADIATION BEAM POSITION SENSOR

[75] Inventors: Walter Perrie; Peter Julian Modern, both of Preston, United Kingdom

[73] Assignee: British Nuclear Fuels PLC, United Kingdom

[21] Appl. No.: 08/669,564

[22] PCT Filed: Mar. 31, 1995

[86] PCT No.: PCT/GB95/00735

§ 371 Date: Nov. 13, 1996

§ 102(e) Date: Nov. 13, 1996

[87] PCT Pub. No.: WO95/27188

PCT Pub. Date: Oct. 12, 1995

[30] Foreign Application Priority Data

Apr. 5, 1994 [GB] United Kingdom .................... 9406605

[51] Int. Cl.$^6$ ................................. G01J 1/20; H01J 3/16
[52] U.S. Cl. ................... 250/201.1; 359/839; 250/206.2; 250/216; 219/121.78
[58] Field of Search .................... 250/201.1, 206.1, 250/206.2, 216; 359/839, 884, 359; 219/121.78, 121.79, 121.81; 372/107, 108, 99; 356/139.04, 139.05, 141.2, 141.5, 152.1, 152.2

[56] References Cited

U.S. PATENT DOCUMENTS

| | | |
|---|---|---|
| 4,117,319 | 9/1978 | White, III .............................. 250/201.1 |
| 4,146,329 | 3/1979 | King et al. .............................. 356/152 |
| 4,547,662 | 10/1985 | Cornwell .............................. 250/201.1 |
| 4,789,770 | 12/1988 | Kasner et al. ....................... 219/121.7 |
| 4,970,383 | 11/1990 | Caudle et al. ........................ 250/216 |
| 4,998,260 | 3/1991 | Taniura ................................ 372/107 |
| 5,047,609 | 9/1991 | Ekstrand .......................... 219/121.78 |
| 5,073,831 | 12/1991 | Flint .................................... 359/845 |
| 5,166,504 | 11/1992 | Protz et al. ......................... 250/201.1 |
| 5,166,505 | 11/1992 | Gorriz et al. ....................... 250/201.7 |
| 5,572,543 | 11/1996 | Heinemann et al. .................. 372/107 |

FOREIGN PATENT DOCUMENTS

| | | |
|---|---|---|
| 0236008 | 9/1987 | European Pat. Off. . |
| 0453733 | 10/1991 | European Pat. Off. . |
| 2682476 | 4/1993 | France . |

Primary Examiner—David Nelms
Assistant Examiner—John R. Lee
Attorney, Agent, or Firm—Sheridan Ross P.C.

[57] ABSTRACT

An apparatus for detecting the position of a primary beam of electromagnetic radiation, the apparatus including a leaky mirror for reflecting the primary beam and for extracting from the primary beam a secondary beam and a position sensitive detector for detecting the spatial position of the secondary beam, wherein the leaky mirror comprises a material which has a transmissivity of less than 0.2 for the radiation of the primary beam and the position sensitive detector is arranged in the path of the secondary beam after transmission by the leaky mirror, the position of the secondary beam providing a measure of the position of the primary beam.

11 Claims, 1 Drawing Sheet

RADIATION BEAM POSITION SENSOR

FIELD OF THE INVENTION

The present invention relates to a device for sensing the position of a beam of radiation, and more particularly but not exclusively to a device for sensing the position of a beam of laser radiation.

BACKGROUND OF THE INVENTION

The problem of laser beam stabilisation over long beam paths is not new, but is one which is becoming more important due to the growth of large laser facilities throughout the world. It is also becoming more relevant due to the emergence of greater interest in lasers from the nuclear, automotive, aerospace and ship building industries who are interested in remote processing and multiple work station operations.

In high power lasers, the large thermal load experienced by the cavity resonator leads to distortion of the cavity resonator mirrors and structure, thereby misaligning the cavity and hence inducing changes in spatial mode and beam direction. As the characteristics of most material processing interactions and critically dependent on the optical parameters, of the radiation, the need for stabilisation becomes apparent. In particular, flexible manufacturing may require the laser to be switched on and off, and so change power level, many times during a processing operation. When a long beam path (greater than 20 meters) is involved, the problems are exaggerated and stabilisation of beam pointing, mode and beam diameter becomes highly desirable.

Initial approaches to stabilising the mode and power of high power lasers (eg $CO_2$ lasers) concentrated on the incorporation of elaborate optical benches into the laser designs. However, even with such an approach, operator intervention was still found to be necessary. More recently, in a series of approaches with increasing complexity, automatic control of beam mode and power of a high power $CO_2$ laser has been carried out by others. A rotating wand sampler has been used to couple 1 per cent of the laser output onto a quadrant thermister array. By comparing average power in each quadrant, feedback signals were used to realign the rear high reflector using motor driven micrometers. Mode and power were stabilised and the system response time was about 2 minutes. In a development of this system a much faster pyro-electric quadrant sensor array in the form of a ring was introduced to match the intensity profile of the laser output in the near field. Feedback to two mirrors within the cavity structure was employed to maintain beam mode and, in addition, a separate, closed loop was established for controlling output power. This resulted in a greatly improved performance with a response time of about 10 seconds. By replacing the pyro-electric sensor array with a thermal imaging screen, video camera and frame grabber for digitising the image, and using image processing techniques, the uniformity of the spatial mode and beam position could be measured and appropriate control signals applied for optimisation. The resulting mode and power stabilisation produced stabilised pointing stability of around 60 $\mu$rad and power stability of less than 4 per cent.

The concept of using partially transmitting or partially reflecting mirrors of different types in laser beam position sensors is known. GB 2184831A describes a mirror having an array of small holes which is used to provide a spatial sample of an incident laser beam, the sampled laser radiation being brought to a focus on a quadrant pyro-electric detector. A disadvantage of this system is that only a small fraction of the incident beam is sampled since the sum of the area of the small holes must be very much less than the area of the laser beam otherwise an unacceptably large portion of the incident beam would be lost through the mirror.

FR 2616555 describes a system in which a laser beam is reflected by a partially-reflecting mirror. The reflected beam is used as a low intensity beam which passes through a further partially reflecting mirror which divides the low intensity beam into two paths, each feeding a quadrant optical sensor. The primary beam is transmitted through the first mentioned mirror. However, it is generally recognised that, when using high power lasers, routing the primary beam from the laser source to a target through a transmitting optical component should be avoided. Thus, the system described in FR 2616555 is unsuitable for use with high power lasers.

Another known system which uses partially-reflecting optical components and quadrant sensors is described in U.S. Pat. No. 4,618,759. In an embodiment of that system, a separate pilot laser beam, parallel to the primary laser beam, is used for detecting beam position. However, this known system suffers from the problem that the misalignment that the primary beam undergoes cannot be compensated for, since the measurement is not carried out on the primary beam.

SUMMARY OF THE INVENTION

According to the present invention there is provided an apparatus for detecting the position of a primary beam of electromagnetic radiation which includes a leaky mirror for reflecting the primary beam and for extracting from the primary beam a secondary beam and a position sensitive detector for detecting the spatial position of the secondary beam, wherein the leaky mirror comprises a material which has a transmissivity of less than 0.2 for the radiation of the primary beam.

The position sensitive detector may be arranged in the path of the secondary beam after transmission by the leaky mirror, the position of the secondary beam providing a measure of the position of the primary beam.

The secondary beam may be focused on the position sensitive detector by a lens or lens assembly.

The leaky mirror may comprise a dielectric reflecting coating on an absorbing substrate. The dielectric reflecting coating may be optimised for a given polarisation of the primary beam. The dielectric reflecting coating desirably has no associated conducting layer.

The radiation of the beam to be measured may comprise radiation having a wavelength in the range 0.1 $\mu$m to 50 $\mu$m, eg in the range 0.4 $\mu$m to 12 $\mu$m. The radiation may comprise a laser beam in the infra-red or visible spectral region. It may, for example, comprise high power radiation of a beam provided by a carbon dioxide laser. For use with such radiation the absorbing substrate of the leaky mirror may comprise a semiconductor having a transmissivity of less than 0.2 for the primary radiation wavelength concerned. Desirably, the transmissivity is less than 0.15. Preferably, in addition, the leaky mirror has on its surface which in use is the front surface upon which the primary beam is incident a reflective coating having a reflectivity greater than 99.5 per cent, desirably greater than 99.7 per cent. For example, the reflectivity may be greater than 99.8 per cent providing a transmissivity of about 0.2 per cent or less. This transmissivity provides a weak secondary beam which is further attenuated in the said substrate as described above.

The overall transmissivity of the mirror may therefore be less than 0.002×0.2 (ie a factor of 0.002 in the coating, and a factor of 0.2 in the substrate), ie less than 0.0004.

The said substrate may, for example, comprise a semiconductor preferably of negligible impurity content, eg undoped silicon or germanium or a so-called group III–V compound, eg gallium arsenide, or alloy of group III–V compounds, or a group II–IV compound, eg zinc selenide, or an alloy of such compounds.

The surface of the leaky mirror which is the rear surface in use is desirably optically polished to minimise reflection at that surface.

The said position sensitive detector may comprise a so-called quadrant detector which may be of known construction. Such a detector contains one or more photosensitive or heat sensitive areas substantially normal to the incident secondary beam which determine the intensity of radiation in each area of interest. For example, the centre of the quadrant may represent the required ideal spatial position of the centre of the primary beam. The position sensitive detector may comprise one or more thermopiles or pyroelectric sensing regions which provide the secondary beam intensity measurements.

The apparatus according to the present invention may further comprise a feedback control loop arranged to act upon a device for adjusting the position of the primary beam. An output error control signal may be derived from the position sensitive detector in a known way (eg as described above) to provide this servo-control. The adjustment may be made, for example, to a micro-motor controlled mirror positioner on an external mirror located close to the laser. In an alternative arrangement, the adjustment may be made to a micro-motor controlled mirror positioner for a laser resonator providing the output laser beam.

In use, the said leaky mirror may be placed at an acute angle, eg with its normal at an angle of about 45 degrees, to the incident beam.

Silicon mirrors have been widely used in high power $CO_2$ lasers at 10.6 $\mu$m as the back mirror of the laser resonant cavity. In such conventional silicon mirrors the highly reflective dielectric coating has a metal underlayer to simplify the coating design. This underlayer absorbs any 10.6 $\mu$m radiation which leaks through the coating. Also in conventional silicon mirrors the absorption coefficient of the silicon substrate will be so high as to preclude any transmission of radiation at 10.6 $\mu$m due to impurities in the silicon.

In using partially transmissive mirrors in laser beam position sensors in accordance with the present invention advantages obtained are as follows: the complete beam is sensed or sampled, the system is non-intrusive, there are no additional power losses, and when coupled with a fast thermopile or other heat sensing quadrant sensor, the potential response times can be very fast, of the order of less than 0.5 second.

BRIEF DESCRIPTION OF THE DRAWINGS

Embodiments of the present invention will now be described by way of example only, with reference to the accompanying drawing in which:

The FIG. 1 is a diagrammatic representation of (part of) a laser beam position sensor.

DETAILED DESCRIPTION OF THE PREFERRED EMBODIMENTS

Figure 1:
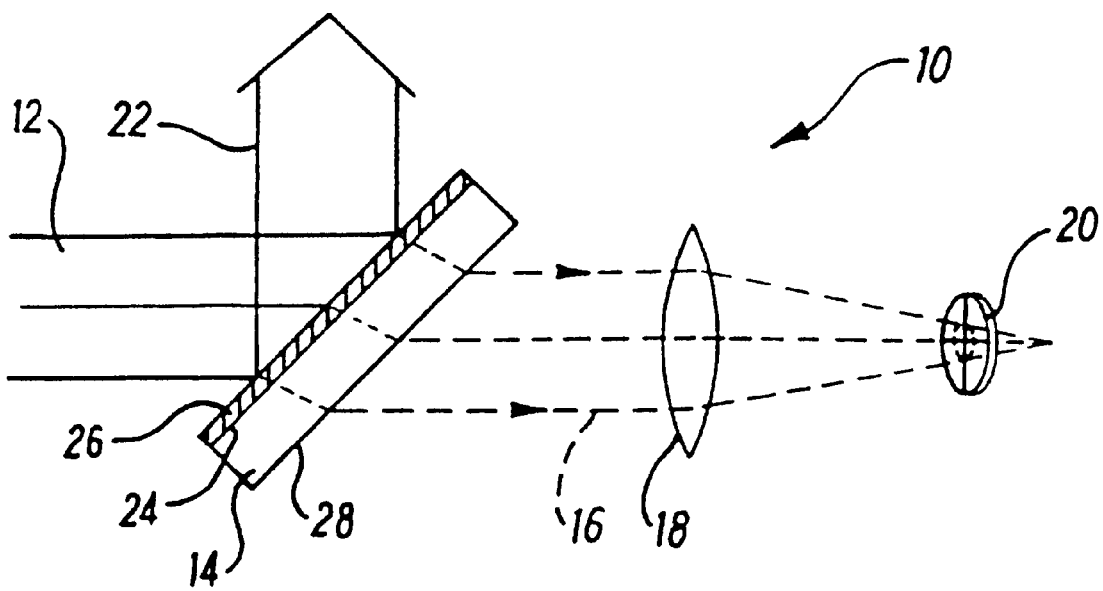

Referring to FIG. 1, a laser beam position sensor 10 is shown in which an incident laser beam 12, from a high power $CO_2$ laser (at 10.6 microns) impinges upon a mirror 14 aligned at an angle of 45° to the incident beam 12. A small portion of the incident beam 12 is transmitted through the mirror 14 to form a secondary beam 16 and is focused by a lens 18 onto a quadrant thermopile detector 20. The remainder of the incident beam is reflected as a primary beam 22 and continues along an optical path to a workpiece (not shown).

The mirror 14 is made from optical grade silicon, having a negligible impurity level and an absorption coefficient of 2.0 cm$^{-1}$. The front surface 24 of the mirror 14 has a coating 26 of an all dielectric, high reflectivity material (for which reflectivity ≧99.8%) but with no metal underlayer beneath the coating 26. The rear surface 28 of the mirror 14 is optically polished.

In operation of the position sensor 10, the incident laser beam 12 strikes the mirror 14 at an angle of 45° (to the normal to the mirror 14). Since the reflectivity of the mirror coating 26 is greater than 99.8%, only about 2% at most of the power of the incident beam 12 will be transmitted through the coating 26. Transmission through the optical grade silicon of the mirror 14 is given by the equation:

$$T=e^{-xt}$$

where T is transmission (or transmissivity), x is the absorption coefficient, (2.0 cm$^{-1}$ for optical grade silicon) and t is the average thickness of the material. Hence for an optical grade silicon mirror 14 having a thickness of 1.2 cm, any radiation transmitted through the high reflective coating 26 would be further attenuated by a factor of about 11. Hence for a laser beam having a power 1 kw, a less than 2 W fraction of the power would be transmitted through the coating 26 and the power would be further attenuated to less than 180 mW by the material of the mirror 14. In practice the power has been found to be attenuated to less than 100 mW. The low intensity transmitted beam 16 emanating from the rear surface 28 of the mirror 14 has a position which is directly related to the high power incident beam 12. The transmitted beam 16 is focused via a zinc selenide lens 18 onto a position sensitive quadrant thermopile detector 20 positioned off the focal plane of the lens 18. In doing so positional information about the transmitted beam 16 and hence the incident beam 12 can be generated. The positional information generated may be routed to a feedback system (not shown) which, if necessary, may make adjustments to the position of the incident beam 12 by means of a motorised mirror assembly (not shown) thereby enabling closed loop control of beam position in a known way. If necessary, an additional attenuator (not shown) may be placed in the transmitted beam 16, at any point after the beam emanates from the mirror 14, in order to reduce the intensity of the transmitted beam 16 to an appropriate level before it strikes the quadrant detector 20.

In an alternative system (not shown) two quadrant detectors can be used, one on the focal plane of the lens 18, and one off the focal plane of the lens 18.

Alternative mirror materials could be zinc selenide (ZnSe) or germanium. However, since at 10.6 $\mu$m the absorption coefficients of these materials are very low, the power of the transmitted beam would be much higher, of the order of a few watts, which would require a high degree of attenuation before striking the quadrant detector.

By varying the thickness of the optical grade silicon mirror the amount of the incident beam transmitted can be varied.

By using a laser beam position sensor of the type described above, the initial alignment of a laser system may be achieved significantly faster than when using conventional techniques, thereby making multiple workstations for one laser more economic. Another advantage is that the laser beam may be maintained during processing, and hence the optimum processing parameters may be maintained throughout the process cycle.

What is claimed is:

1. An apparatus for detecting the position of a primary beam of electromagnetic radiation, comprising a leaky mirror and a position sensitive detector arranged to receive and to detect the spatial position of a portion of the primary beam transmitted through said leaky mirror, the position of said portion providing an indication of the position of the primary beam wherein the leaky mirror comprises a reflecting coating, disposed on a substrate, for reflecting the primary beam, said substrate having a transmissivity of less than 0.2 for attenuating said portion of said primary beam transmitted by the reflecting coating towards the position sensitive detector.

2. An apparatus as in claim 1 and wherein the radiation of the primary beam comprises radiation having a wavelength in the range 0.1 $\mu$m to 50 $\mu$m.

3. An apparatus as in claim 1 and wherein the radiation comprises a laser beam in the infra red or visible spectral region.

4. An apparatus as in claim 1 wherein the leaky mirror comprises a dielectric reflecting coating on an absorbing substrate wherein the dielectric reflecting coating has no associated conducting layer.

5. An apparatus as in claim 4 and wherein the dielectric reflecting coating is coated on that surface of the leaky mirror which in use is the front surface upon which the primary beam is incident, the reflecting coating having a reflectivity greater than 99.5 per cent for the radiation of the primary beam.

6. An apparatus as in claim 1 wherein the apparatus includes a feedback control loop arranged to act upon a device for adjusting the position of the primary beam, and an output control signal being derived from the position sensitive detector to provide servo-control.

7. An apparatus as in claim 1 and wherein the substrate comprises an undoped semiconductor material of negligible impurity content.

8. An apparatus as in claim 1 and wherein the surface of the leaky mirror which is the rear surface in use is optically polished to minimize reflection at that surface.

9. An apparatus as in claim 1 and wherein in use, the leaky mirror is placed with its normal at an acute angle to the primary beam.

10. An apparatus as in claim 1 wherein the secondary beam is focused on the position sensitive detector by a lens or lens assembly.

11. An apparatus as in claim 1 wherein the position sensitive detector comprises a quadrant detector.

* * * * *